(12) United States Patent
Duan et al.

(10) Patent No.: US 8,625,267 B2
(45) Date of Patent: Jan. 7, 2014

(54) BUTTON ACTIVATED SPRING-LOADED HINGE ASSEMBLY

(75) Inventors: Chao Duan, Shenzhen (CN); Chia-Hua Chen, Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 605 days.

(21) Appl. No.: 12/952,352

(22) Filed: Nov. 23, 2010

(65) Prior Publication Data

US 2011/0286160 A1 Nov. 24, 2011

(30) Foreign Application Priority Data

May 19, 2010 (CN) .......................... 2010 1 0176404

(51) Int. Cl.
*E05D 11/10* (2006.01)
*H05K 5/00* (2006.01)
*G06F 1/16* (2006.01)

(52) U.S. Cl.
USPC ............. 361/679.27; 16/303; 16/312; 16/330

(58) Field of Classification Search
USPC ......................... 361/679.27; 16/330, 303, 312
See application file for complete search history.

(56) References Cited

U.S. PATENT DOCUMENTS 7,895,710 B2 * 3/2011 Takagi et al. .................. 16/330
7,913,359 B2 3/2011 Duan et al.

FOREIGN PATENT DOCUMENTS

CN 101469738 A 7/2009

* cited by examiner

*Primary Examiner* — Ramon Barrera
(74) *Attorney, Agent, or Firm* — Altis Law Group, Inc.

(57) ABSTRACT

A hinge assembly includes a receiving seat, a control member, a clutch member, a follower, a main shaft and an elastic element. The receiving seat includes a first cam surface. The control member is releasably latched with the receiving seat. The clutch member includes at least one projection. The follower includes a second cam surface engaging with the at least one projection. The receiving seat, the control member, the clutch member and the follower are placed around the shaft. The elastic element provides an elastic force for the follower. After the control member is unlocked, the second cam surface engages with the first cam surface.

15 Claims, 9 Drawing Sheets

BUTTON ACTIVATED SPRING-LOADED HINGE ASSEMBLY

BACKGROUND

1. Technical Field

The present disclosure relates to hinge assemblies and, particularly, to a spring-loaded hinge assembly for foldable devices such as portable telephones and portable computers that can activated by button.

2. Description of Related Art

Some hinge assemblies are spring-loaded and are used to assist in opening the foldable parts of mobile phones, which generally include a cover section and a body section. This kind of hinge assembly includes threaded engagement of its parts and is relatively complicate to manufacture. In addition, the threaded structure needs to be made of high strength material, which is costly.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION

Figure 1:
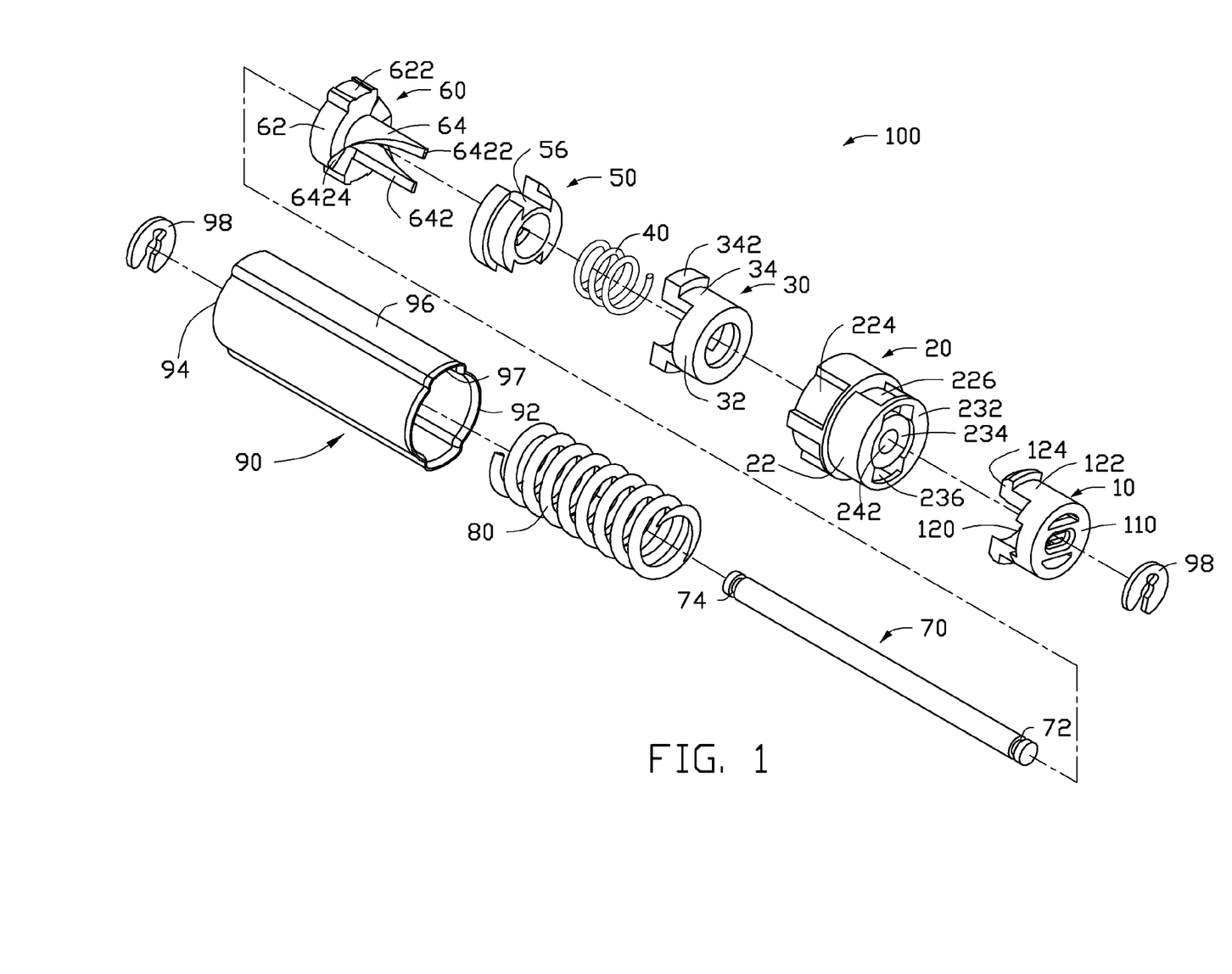
FIG. 1 is an exploded, isometric view of the exemplary embodiment of the hinge assembly shown in FIG. 1.
Figure 2:
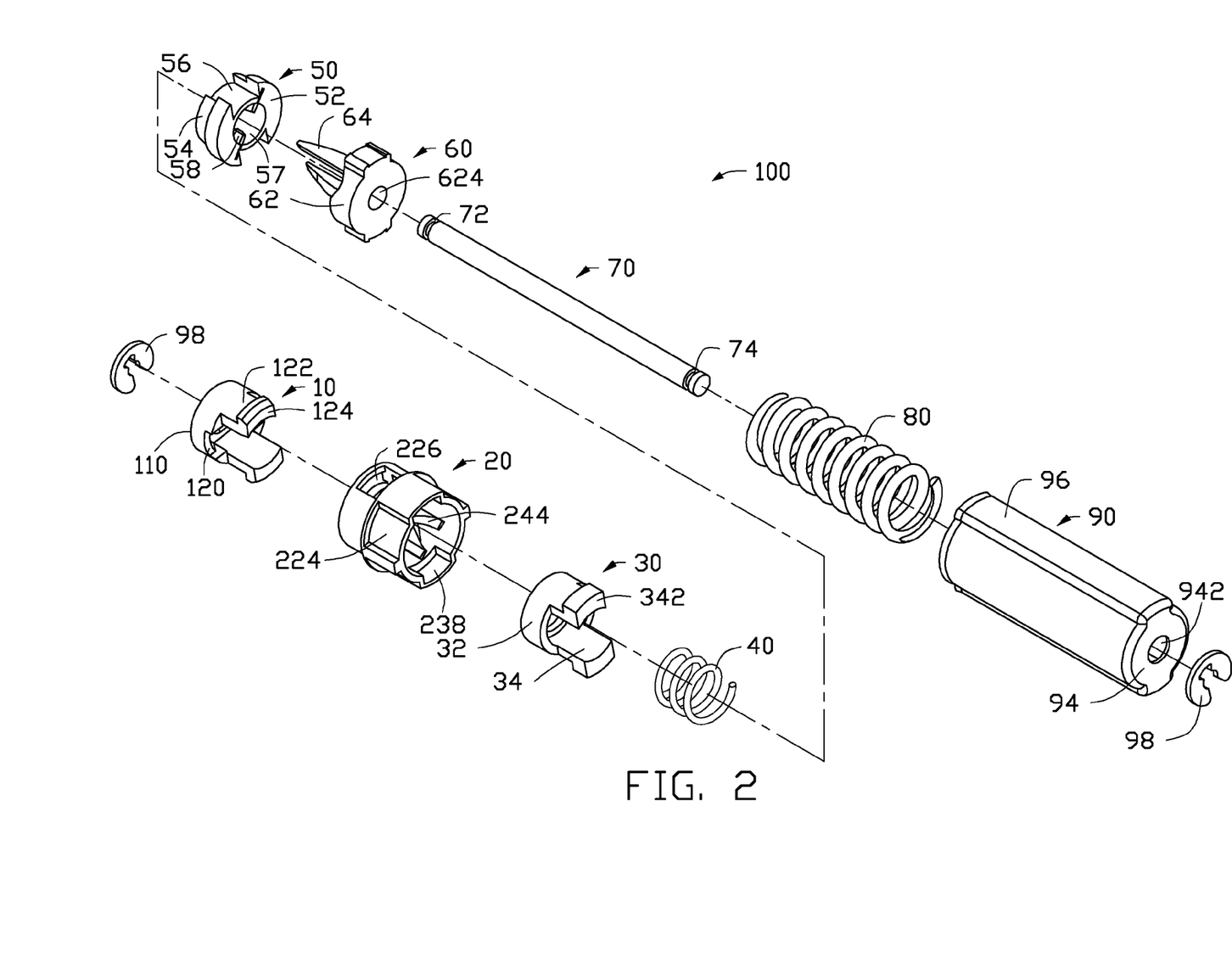
FIG. 2 is similar to FIG. 1, but viewed from another aspect.

Referring to the drawings in detail, FIGS. 1 and 2 show a hinge assembly 100 applied in a foldable electronic device such as a flip type mobile phone. The hinge assembly 100 can be used in other environments (e.g. cabinet doors). Although used here in a foldable electronic device, the hinge assembly 100 should not be considered limited in scope solely to foldable electronic devices.

The hinge assembly 100, in the embodiment illustrated, includes a button 10, a receiving seat 20, a control member 30, a return elastic member 40, a clutch member 50, a follower 60, a shaft 70, a main elastic member 80, a sleeve 90, and two washers 98.

The button 10 is substantially cylindrical, and includes a pressed end 110 and an opposite open end 120. Two symmetric arms 122 are formed on the open end 120. A hook 124 extends from each arm 122. The button 10, when pressed, can press the control member 30 received in the receiving seat 20 so that the control member 30 is unlocked.

Figure 3:
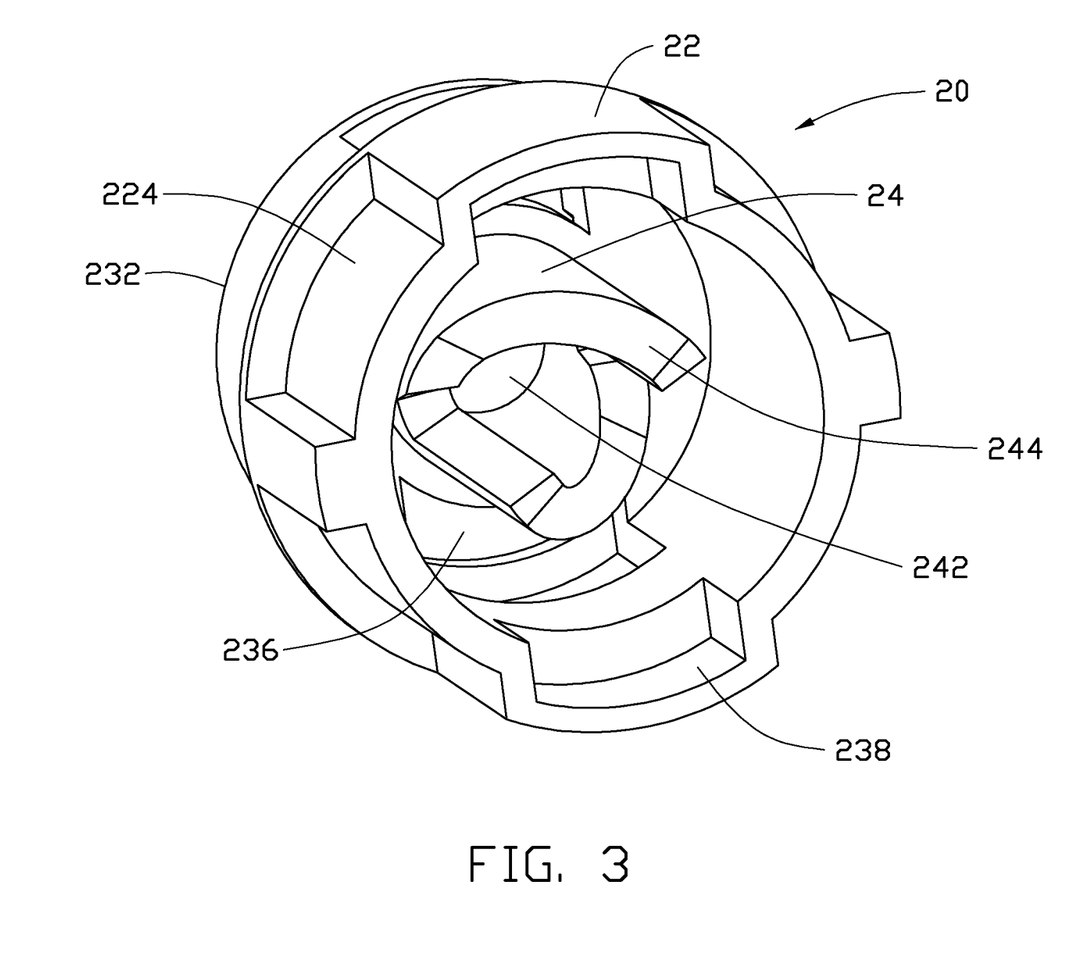
FIG. 3 is an enlarged view of the receiving seat.

Referring to FIG. 3, the receiving seat 20 includes an outer sleeve 22 and an inner sleeve 24 integrally formed together. The outer sleeve 22 is substantially a hollow cylinder, and includes an end wall 232. The inner sleeve 24 axially extends from the end wall 232 in the outer sleeve 22. The outer sleeve 22 defines a plurality of seat grooves 224 at an outer circumferential wall thereof for engaging with a body section of the mobile phone so that the receiving seat 20 and the body section cannot rotate relative to each other. The outer sleeve 22 defines two opposite latching grooves 226 adjacent to the end wall 232 for connecting the button 10. The outer sleeve 22 defines two limiting grooves 238 at an inner circumferential wall. The end wall 232 defines a receiving groove 234 and two retaining grooves 236. The retaining grooves 236 communicate with the latching grooves 226. The arms 122 of the button 10 can be inserted into the retaining grooves 236, and the hooks 124 can be slidably latched into the latching grooves 226. The inner sleeve 24 defines a through hole 242 communicating with the end wall 232. A first cam surface 244 is formed at one end of the inner sleeve 24 far away from the end wall 232.

The control member 30 can be received in the receiving seat 20. The control member 30 includes a hollow body 32 and two extending arms 34 integrally formed together. The control member 30 surrounds the inner sleeve 24. The body 32 abuts against the end wall 232, and is exposed from the latching grooves 226. A block 342 radially extends from a distal end of each extension arm 34. The blocks 342 are received in the limiting grooves 238.

The return elastic member 40 is substantially cylindrical, and may be received in the control member 30 for returning the control member 30 to an original orientation it has been moved from.

Figure 4:
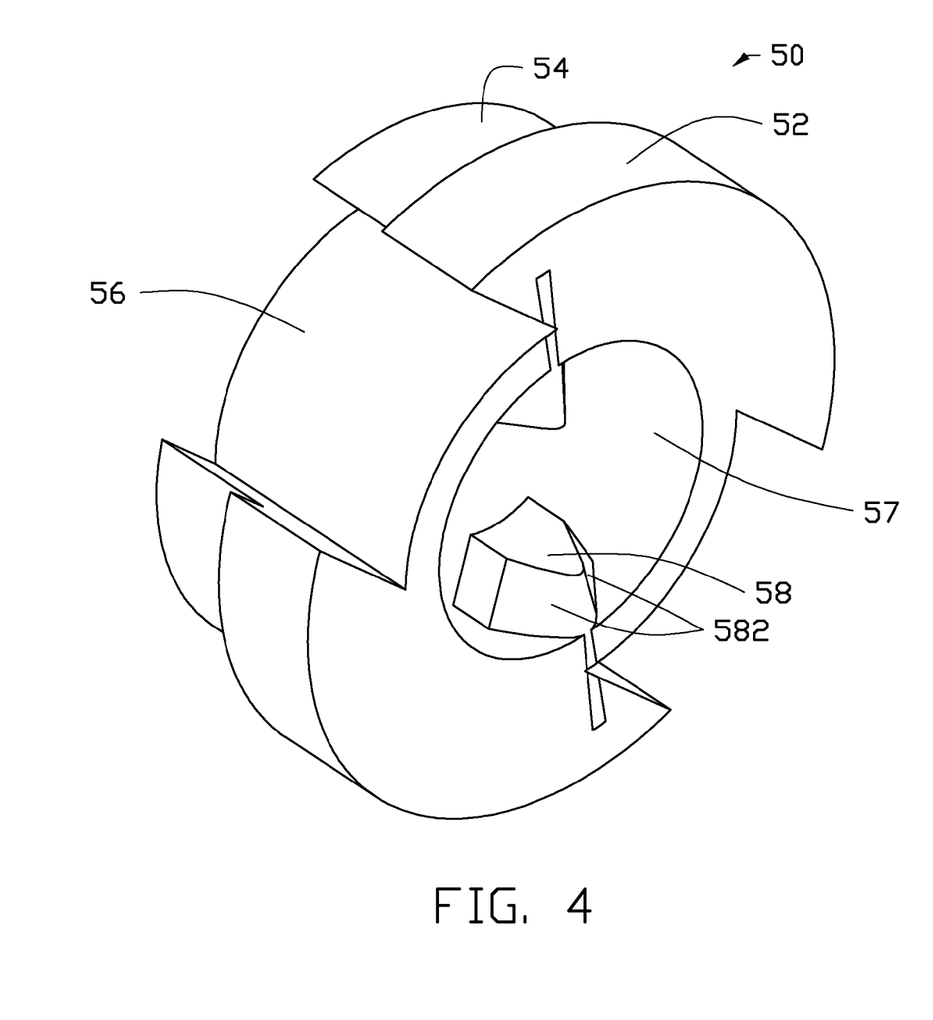
FIG. 4 is an enlarged view of the clutch member.

Referring to FIG. 4, the clutch member 50 includes a first portion 52 and a second portion 54. The first portion 52 is wider than the second portion 54. Two opposite slots 56 are defined in the first portion 52 and the second portion 54. A circular hole 57 is defined in the clutch member 50. Two opposite projections 58 are formed in the circular hole 57. The projections 58 are one portion of a cam surface. In this exemplary embodiment, the projections 58 are substantially two peaks of the cam surface. Each projection 58 includes a resisting surface 582. The extending arms 34 are received in the slots 56.

Figure 5:
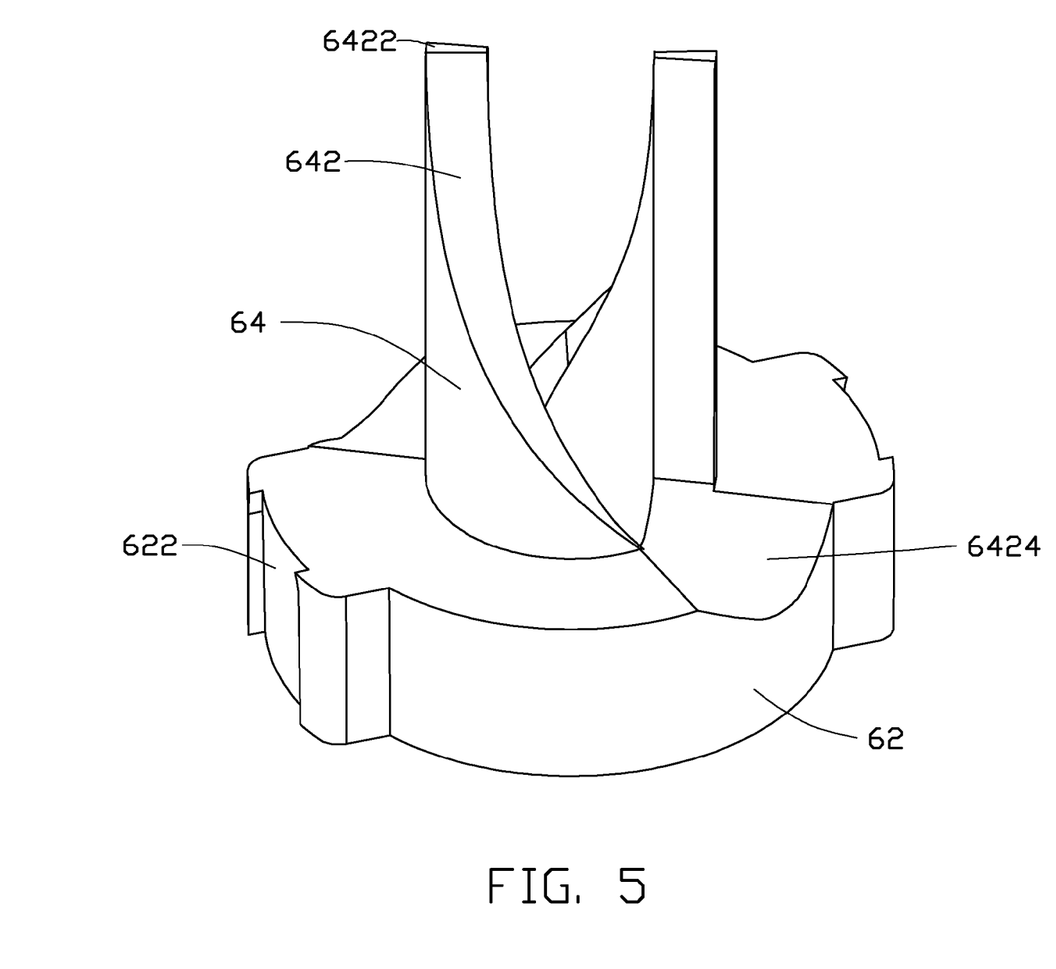
FIG. 5 is an enlarged view of the follower.

Referring also to FIG. 5, the follower 60 includes a seat portion 62 and a cam portion 64. Two latching portions 622 are formed on the seat portion 62 for connecting to the sleeve 90. The seat portion 62 defines a passage 624. The cam portion 64 includes a second cam surface 642. The second cam surface 642 includes two peaks 6422 and two valleys 6424. The second cam surface 642 selectably engages with the projections 58 or the first cam surface 244.

The shaft 70 extends through, in order, the receiving seat 20, the control member 30, the return elastic member 40, the clutch member 50, the follower 60, the main elastic member 80, and the sleeve 90. The shaft 70 forms a first locking end 72 and a second locking end 74 at opposite ends thereof.

The sleeve 90 is a substantially hollow cylinder, and includes an open end 92 and a partially-closed end 94. The partially-closed end 94 of the sleeve 90 defines a central hole 942. Opposite portions of the sleeve 90 are protruded outward to from two inner lengthwise troughs 97. The external surfaces of the troughs 97 engage with a cover section of the mobile phone.

The washers 98 are respectively engaged with the first locking end 72 and the second end 74 of the shaft 70.

Figure 6:
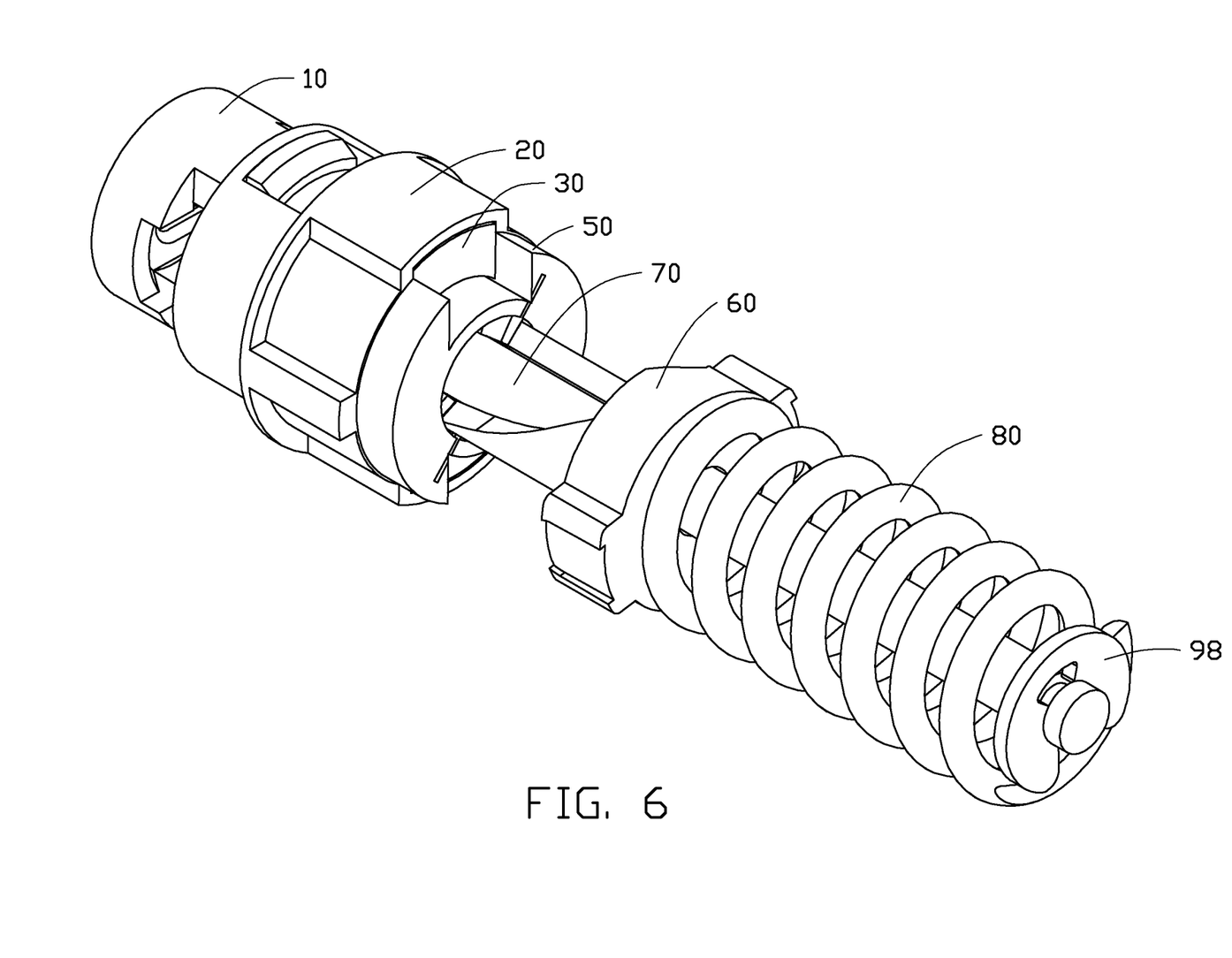
FIG. 6 is a partially assembled view showing the hinge assembly.
Figure 7:
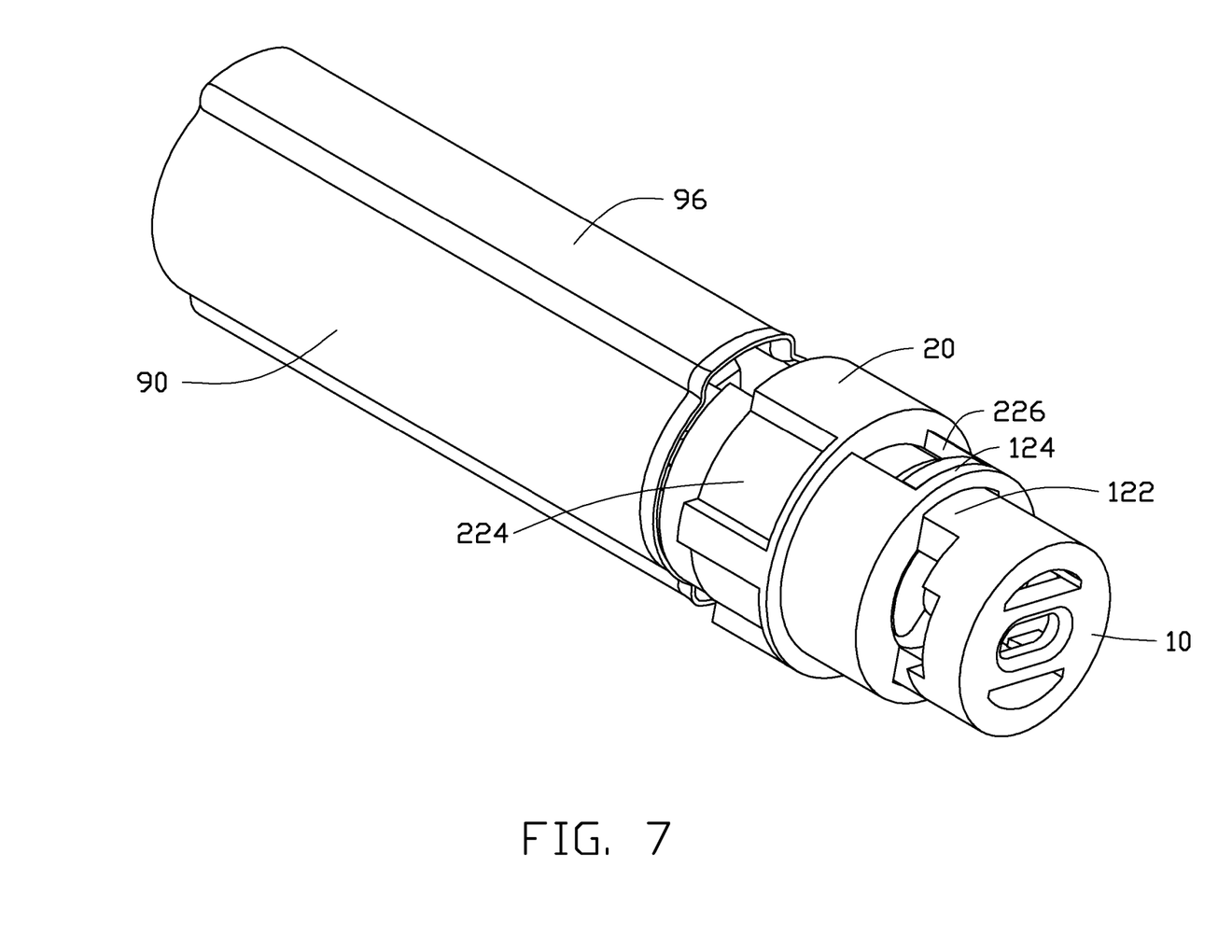
FIG. 7 is an assembled view showing the hinge assembly.

In assembly, referring to FIGS. 6 to 7, the control member 30 is received in the receiving seat 20. The body 32 is placed around the inner sleeve 24, and abuts against the end wall 232. The blocks 342 of the control member 30 are received in the limiting grooves 238. The return elastic member 40 is placed around the inner sleeve 24, and abuts against the body 32. The first locking end 72 of the shaft 70 orderly passes through the control member 30, the return elastic member 40, and the receiving seat 20. As noted above, one of the washers 98 is latched with the first locking end 72 to retain the above elements to one end of the shaft 70.

The follower 60 and the clutch member 50 are inserted into the shaft 70 from the second locking end 74. The blocks 342 are received in the slots 56. The peaks 6422 of the follower 60 abut against the projections 58 of the clutch member 50. The main elastic member 80 is fitted over the shaft 70, and one end of the main elastic member 80 abuts against the follower 60. After the above elements are assembled, the sleeve 90 is placed around the shaft 70. The open end 92 of the sleeve 90 is adjacent to the receiving seat 20. The partially-closed end 94 of the sleeve 90 resists the main elastic element 80. The latching portions 622 of the follower 60 are engaged in the trough 97 of the sleeve 90 to limit the rotation therebetween. The second locking end 74 is exposed from the central hole 942, and the other washer 98 is latched on the second locking end 74. Finally, the arms 122 of the button 10 are received in the retaining grooves 236 and abut against the control member 30. The hooks 124 are slidably received in the latching grooves 226 to prevent the button from separating from the receiving seat 20. Accordingly, the hinge assembly 100 is assembled.

Figure 8:
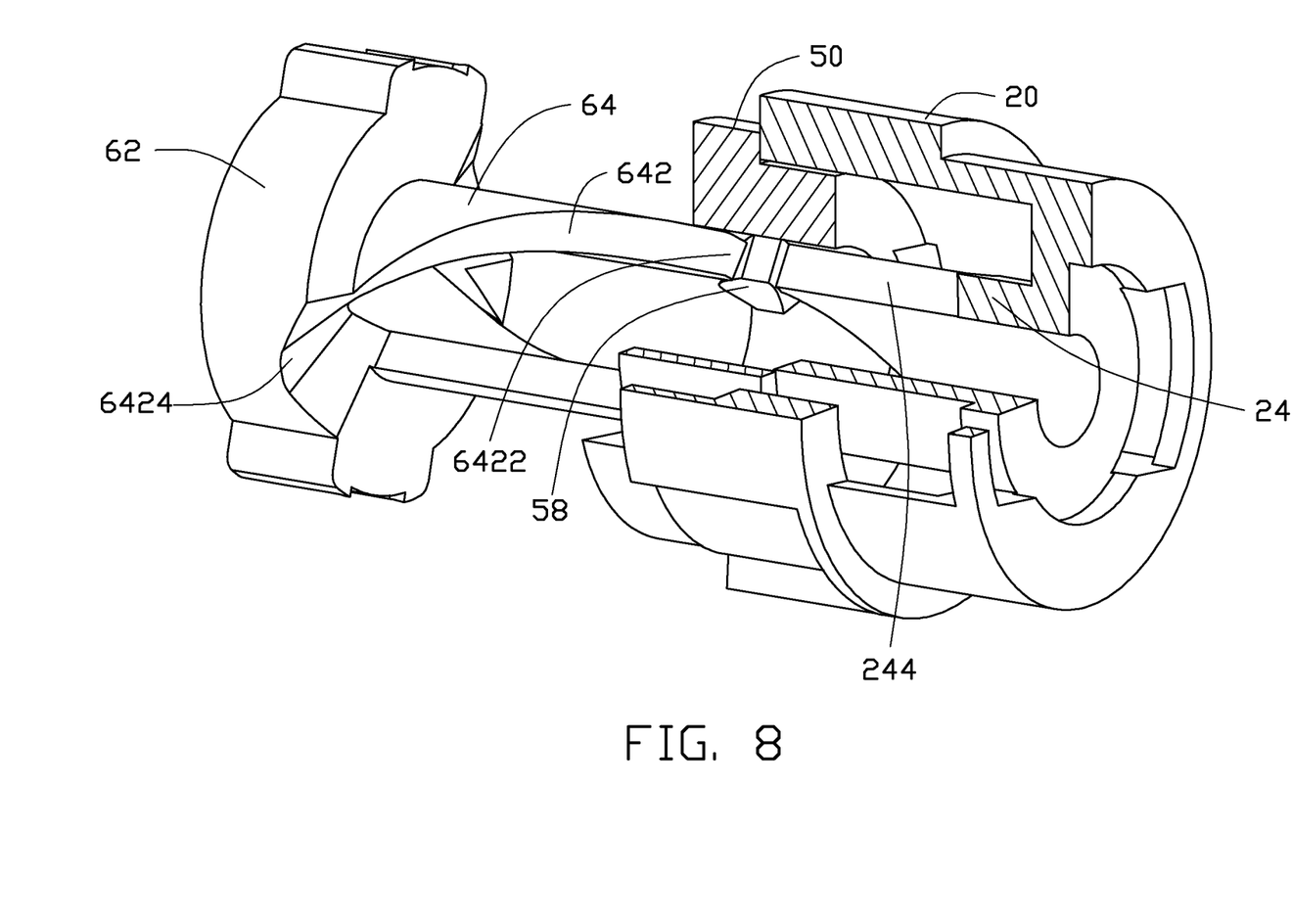
FIG. 8 is a schematic view showing the hinge assembly in a closed state.

Referring to FIG. 8, when the mobile phone is closed, the peaks 6422 abut against the resisting surface 582 of the projections 58. Because the control member 30 is engaged with the receiving seat 20 and the clutch member 50 is engaged with the control member 30, the clutch member 50 cannot rotate relative to the receiving seat 20.

Figure 9:
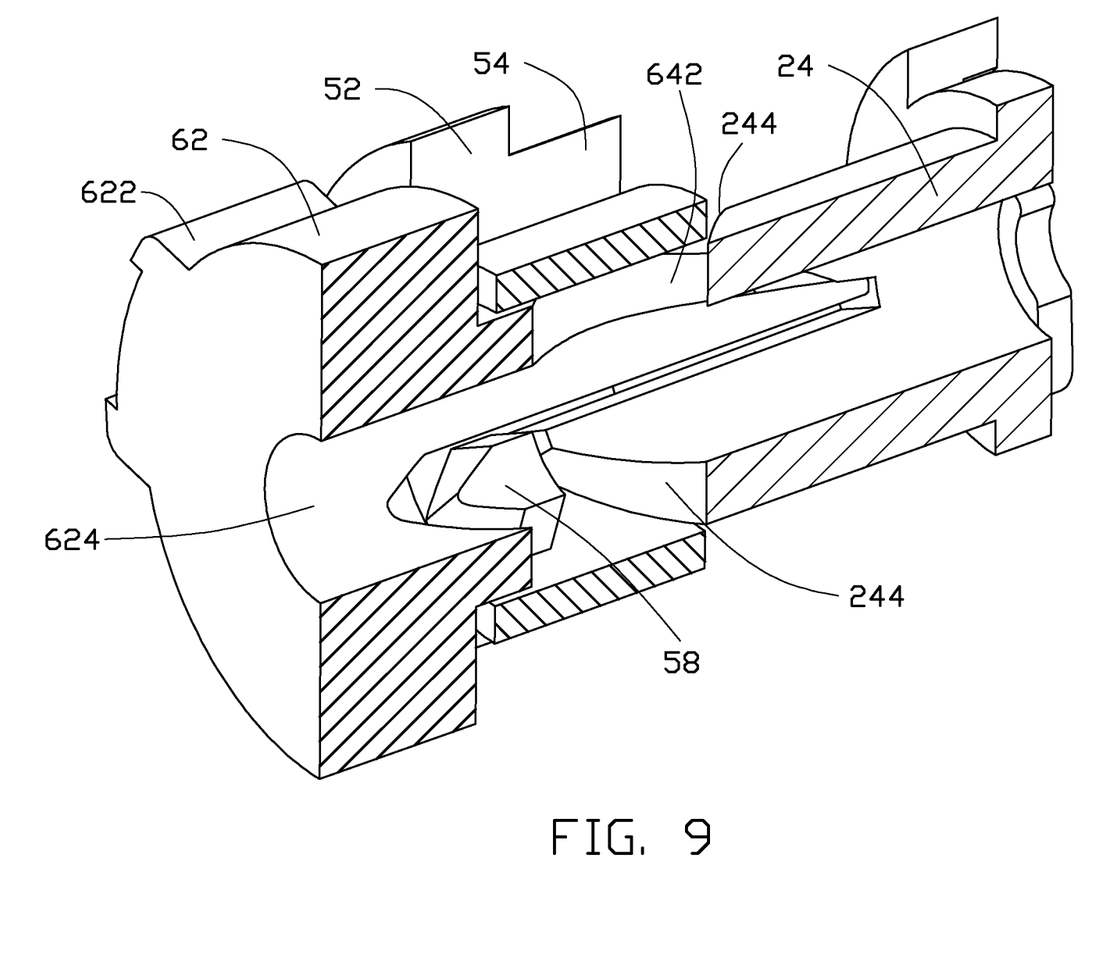
FIG. 9 is a schematic view showing the hinge assembly in an open state.

To open the mobile phone, a user presses and releases the button 10. When pressed, the button 10 moves along an axial direction of the shaft 70, the arms 122 of the button 10 then push the control member 30 to move away from the button 10 in the axial direction of the shaft 70. The control member 30 moves along the axis until the extension arms 34 of the control member 30 move out of the limiting grooves 238 of the receiving seat 20, compressing the return elastic member 40 toward the clutch member 50. The peaks 6422 of the follower 60 rotate relative to the projections 58 until the peaks 6422 slide to the first cam surface 244. Accordingly, the follower 50 automatically rotates relative to the receiving seat 20. Rotation of the follower 60 causes the clutch member 50 to rotate until the projections 58 are received in the valleys 6424. The elastic potential energy of the return elastic spring 40 then pushes the control member 30 to move toward the button 10. Furthermore, the follower 60 rotates the sleeve 90 so that the cover section of the mobile phone is opened. When the mobile phone is closed, the cover section rotates the sleeve 90. The second cam surface 642 rotates relative to the first cam surface 244 until contacting the projections 58 of the clutch member 50 and parting from the first cam surface 244. Thus, the hinge assembly is completely closed.

As described above, the present embodiment provides a hinge assembly 100 for use with various portable devices, beyond the mobile phone illustrated, and/or with other devices needing a hinge assembly that facilitates the achievement of fully open and fully closed positions.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely being preferred or exemplary embodiments of the disclosure.

What is claimed is:

1. A hinge assembly, comprising:
a receiving seat including a first cam surface;
a control member releasably latched with the receiving seat;
a clutch member including at least one projection, the control member slidably engaging with the clutch member;
a return elastic member positioned between the control member and the clutch member for returning the control member;
a follower including a second cam surface engaging with the at least one projection; and
a main shaft, the receiving seat, the control member, the clutch member and the follower placed around the shaft;
a main elastic element providing an elastic force for the follower; and
wherein the control member is pressed to move toward the clutch member and compresses the return elastic member for being unlocked from the receiving seat, the second cam surface rotate relative to the at least one projection until the second cam surface engages with the first cam surface, the follower automatically rotates relative to the receiving seat, and rotation of the follower causes the clutch member to rotate until the at least one projection engages with the second cam surface.

2. The hinge assembly as claimed in claim 1, wherein the receiving seat defines two limiting grooves, and the control member includes two blocks slidably received in the limiting grooves.

3. The hinge assembly as claimed in claim 2, wherein the clutch member defines two slots, and the blocks are received in the slots.

4. The hinge assembly as claimed in claim 1, wherein the receiving seat includes an outer sleeve and an inner sleeve integrally formed together, and the first cam surface is formed on the inner sleeve.

5. The hinge assembly as claimed in claim 4, further comprising a button including two hooks, wherein the outer sleeve defines two opposite latching grooves, the hooks are slidably latched into the latching grooves.

6. The hinge assembly as claimed in claim 1, wherein the clutch member includes a first portion and a second portion, and a diameter of the first portion is larger than that of the second portion.

7. The hinge assembly as claimed in claim 6, wherein a circular hole is defined in the clutch member, and the at least one projection is formed in the circular hole.

8. The hinge assembly as claimed in claim 6, wherein two opposite slots are defined in the first portion and the second portion, and the control member includes two blocks received in the slots.

9. A foldable electronic device having at least two components hinged together by a hinge assembly, the hinge assembly comprising:
a receiving seat including a first cam surface;
a control member releasably latched in the receiving seat;
a clutch member releasably latched with the control member, the clutch member including two projections;
a follower including a second cam surface engaging with the projections or the first cam surface; and
a main shaft, the receiving seat, the control member, the clutch member and the follower placed around the shaft;
an elastic element providing an elastic force to make the second cam surface abut against the projections or the first cam surface;
wherein the receiving seat includes an outer sleeve and an inner sleeve integrally formed together, and the first cam surface is formed on the inner sleeve.

10. The foldable electronic device as claimed in claim 9, further comprising a button including two hooks, wherein the outer sleeve defines two opposite latching grooves, the hooks are slidably latched into the latching grooves.

11. The foldable electronic device as claimed in claim 9, wherein the clutch member includes a first portion and a second portion, and a diameter of the first portion is larger than that of the second portion.

12. The foldable electronic device as claimed in claim 11, wherein a circular hole is defined in the clutch member, and the at least one projection is formed in the circular hole.

13. The foldable electronic device as claimed in claim 11, wherein two opposite slots are defined in the first portion and the second portion, and the control member includes two blocks received in the slots.

14. A hinge assembly, comprising:
- a receiving seat including an outer sleeve and an inner sleeve integrally formed together, and a first cam surface formed on the inner sleeve;
- a control member releasably latched with the receiving seat;
- a clutch member including at least one projection;
- a follower including a second cam surface engaging with the at least one projection; and
- a main shaft, the receiving seat, the control member, the clutch member and the follower placed around the shaft;
- an elastic element providing an elastic force for the follower; and
- wherein after the control member is unlocked, the second cam surface engages with the first cam surface.

15. The hinge assembly as claimed in claim 14, further comprising a button including two hooks, wherein the outer sleeve defines two opposite latching grooves, the hooks are slidably latched into the latching grooves.

* * * * *